US008955115B2

(12) United States Patent
Sabetta et al.

(10) Patent No.: US 8,955,115 B2
(45) Date of Patent: Feb. 10, 2015

(54) AUTOMATIC GENERATION OF SECURITY CHECKS

(75) Inventors: Antonino Sabetta, Mougins (FR); Michele Bezzi, Le Haut Sartoux-Valbonne (FR)

(73) Assignee: SAP SE, Walldorf (DE)

( * ) Notice: Subject to any disclaimer, the term of this patent is extended or adjusted under 35 U.S.C. 154(b) by 285 days.

(21) Appl. No.: 13/543,430

(22) Filed: Jul. 6, 2012

(65) Prior Publication Data

US 2014/0013415 A1    Jan. 9, 2014

(51) Int. Cl.
*H04L 29/06* (2006.01)
(52) U.S. Cl.
CPC ................................. *H04L 63/1441* (2013.01)
USPC .......................................................... 726/22
(58) Field of Classification Search
None
See application file for complete search history.

(56) References Cited

U.S. PATENT DOCUMENTS

| 6,557,167 | B1 * | 4/2003 | Thelen .......................... 717/127 |
| 7,043,757 | B2 * | 5/2006 | Hoefelmeyer et al. ......... 726/24 |
| 8,046,835 | B2 * | 10/2011 | Herz ................................ 726/25 |
| 2007/0074169 | A1 * | 3/2007 | Chess et al. .................... 717/126 |
| 2011/0078797 | A1 * | 3/2011 | Beachem et al. ............... 726/25 |

OTHER PUBLICATIONS

Anya Kim, "Security Ontology for Annotaing Resources," 2005, pp. 1483-1498.*
Amina Souag, "Ontologies for Security Requirements: A Literature Survey and Classification," 2012, pp. 1-8.*
Bill Tsoumas, "Towards an Ontology-based Security Management," 2006, pp. 1-6.*
"Nagios", http://nagios.sourceforge.net, 2009, 3 pages.
"UML 2.0 Superstructure Specification", Technical report, Object Management Group (OMG), Aug. 2005, 710 pages.
"AndroMDA", http://andromda.org/, retrieved on Jun. 17, 2009, 3 pages.
Best, et al, "Model-based security engineering of distributed information systems using UMLsec", Proceedings of the 29th international conference on Software Engineering, 2007, pp. 581-590.
Ekelhart, et al, "Security ontologies: Improving quantitative risk analysis", Proceedings of the 40th Annual Hawaii International Conference on System Sciences, 2007, 7 pages.
Fenz, et al, "Information security fortication by ontological mapping of the iso/iec 27001 standard", Proceedings of the 13th Pacific Rim International Symposium on Dependable Computing, 2007, pp. 381-388.

(Continued)

*Primary Examiner* — Benjamin Lanier
(74) *Attorney, Agent, or Firm* — Brake Hughes Bellermann LLP

(57) ABSTRACT

The embodiments encompass an apparatus for generating security checks including a model editor configured to annotate at least one element in an architectural source model with security requirement information and countermeasure information. The security requirement information identifies the at least one element and provides a textual description of a corresponding security requirement, and the countermeasure information identifies the at least one element and indicates a countermeasure type to the corresponding security requirement. The apparatus also includes a code generation engine configured to generate a security check for the countermeasure information based on the countermeasure type.

20 Claims, 6 Drawing Sheets

(56) References Cited

OTHER PUBLICATIONS

Jung, et al, "Architectural assertions: Checking architectural constraints at run-time", Software Engineering Research and Practice, TR #07-18, Apr. 2007, 5 pages.

Juerjens, "Model-based run-time checking of security permissions using guarded objects", Lecture Notes in Computer Science vol. 5289, 2008, pp. 36-50.

* cited by examiner

500

```
┌─────────────────────────────────────────────────────────┐
│ Annotating at least one element in an architectural source model │
│ with security requirement information and countermeasure │
│ information, the security requirement information identifying the │
│ element and providing a textual description of a corresponding │─ 502
│ security requirement, the countermeasure information identifying │
│ the corresponding element and indicating a countermeasure type │
│ to the corresponding security requirement │
└─────────────────────────────────────────────────────────┘
                            │
                            ▼
┌─────────────────────────────────────────────────────────┐
│ Automatically generating a security check for the countermeasure │─ 504
│ information based on the countermeasure type │
└─────────────────────────────────────────────────────────┘
```

FIG. 5

_AUTOMATIC GENERATION OF SECURITY CHECKS_

BACKGROUND

As a result of an architecture-level security analysis, a number of technical requirements are derived, which must be translated into implementation choices, e.g., countermeasures in the development, deployment, configuration, and operation phases. However, once these countermeasures are in place, it may be difficult to reconstruct their original rationale a-posteriori. Failure to establish such a link between countermeasures and the corresponding architecture-level rationale can lead to negative effects if mechanisms related to security are modified without an assessment of the impact of these modifications.

For example, the disconnection between the architectural design of an application and the implementation of the application is a well known problem in software and security engineering. Generally, the forward link (e.g., the architecture-level specifications to implementation and operational configurations) may be established at development or deployment time when the detailed security requirements stemming from the architectural analysis are translated into countermeasures. A countermeasure may be the considered the specific implementation technique to satisfy a security requirement. One example of a countermeasure may be the use of a particular software library, e.g., to apply input sanitization to all data coming from untrusted sources. This type of countermeasure may be motivated by a particular security requirement related to the integrity of incoming data.

The reverse link (e.g., from countermeasures to the security requirements) may be considered more problematic to establish and maintain. Often times, the links from the countermeasures to the security requirements are neglected, or left to ad-hoc manual, time-consuming and error-prone methods. Also, if the context where a system operates is changed, it may be difficult to trace these changes back to the architectural rationale and to assess how the changed system would impact the overall system security.

SUMMARY

The embodiments encompass an apparatus for generating security checks including a model editor configured to annotate at least one element in an architectural source model with security requirement information and countermeasure information. The security requirement information identifies the at least one element and provides a textual description of a corresponding security requirement, and the countermeasure information identifies the at least one element and indicates a countermeasure type to the corresponding security requirement. The apparatus also includes a code generation engine configured to generate a security check for the countermeasure information based on the countermeasure type.

The at least one element may include a component, a communication channel between components, and/or deployment of the component. The architectural source model may include a structural model having a plurality of elements and a deployment model that maps one of more of the elements onto an underlying deployment platform. The countermeasure type may include code import, configuration flag in text file, deployment of the element to a node, configuration flag in registry, dependency to a database, and/or configuration flag in the database.

The apparatus may further include a user interface associated with the model editor configured to receive the textual description and the countermeasure type from a user of the model editor.

According to one embodiment, the code generation engine configured to generate a security check for the countermeasure information based on the countermeasure type may include selecting a security check template from a database storing a plurality of security check templates based on the countermeasure type and generating the security check based on the selected security check template.

The security check may include verification that a file or a set of files are present in a specified path, verification that a specified package is included in a java source code, verification that a version of a database corresponds to a specified version, verification that a version of an included or linked library corresponds to a specified version, and/or verification that a physical execution environment has one or more characteristics.

According to one embodiment, the apparatus may further include a runtime engine configured to execute the security check in reaction to an event or at a scheduled time. The runtime engine may be configured to provide, via a user interface, a list of available security checks including the generated security check, outcome information indicating execution results and execution times of one or more security checks, and history information indicating past execution results and execution times for one or more available security checks. Also, the runtime engine may be configured to receive, via the user interface, information that edits the generated security check, and the code generation engine may be configured to re-generate the security check based on the received information.

The embodiments also provide a method for generating security checks performed by one or more processors. The method may include annotating at least one element in an architectural source model with security requirement information and countermeasure information. The security requirement information identifies the at least one element and provides a textual description of a corresponding security requirement, and the countermeasure information identifies the at least one element and indicates a countermeasure type to the corresponding security requirement. The method further includes generating a security check for the countermeasure information based on the countermeasure type.

The at least one element may include a component, a communication channel between components, and/or deployment of the component. The architectural source model may include a structural model having a plurality of elements and a deployment model that maps one of more of the elements onto an underlying deployment platform. The countermeasure type may include code import, configuration flag in text file, deployment of the element to a node, configuration flag in registry, dependency to a database, and/or configuration flag in the database.

According to one embodiment, the generating a security check for the countermeasure information based on the countermeasure type may include selecting a security check template from a database storing a plurality of security check templates based on the countermeasure type and generating the security check based on the selected security check template.

The security check may include verification that a file or a set of files are present in a specified path, verification that a specified package is included in a java source code, verification that a version of a database corresponds to a specified version, verification that a version of an included or linked library corresponds to a specified version, or verification that a physical execution environment has one or more characteristics.

The embodiments also provide a non-transitory computer-readable medium storing instructions that when executed cause a data processing apparatus to annotate at least one element in an architectural source model with security requirement information and countermeasure information. The security requirement information identifies the at least one element and provides a textual description of a corresponding security requirement, and the countermeasure information identifying the at least one element and indicating a countermeasure type to the corresponding security requirement. The instructions include instructions to generate a security check for the countermeasure information based on the countermeasure type.

The at least one element may include a component, a communication channel between components, and/or deployment of the component. The architectural source model may include a structural model having a plurality of elements and a deployment model that maps one of more of the elements onto an underlying deployment platform. The countermeasure type may include code import, configuration flag in text file, deployment of the element to a node, configuration flag in registry, dependency to a database, and/or configuration flag in the database.

The details of one or more implementations are set forth in the accompanying drawings and the description below. Other features will be apparent from the description and drawings, and from the claims.

BRIEF DESCRIPTION OF THE DRAWINGS

FIG. 5 is a flowchart illustrating example operations of the apparatus of FIG. 1 according to an embodiment;

DETAILED DESCRIPTION

The embodiments provide a model to capture the dependencies between security requirements and the corresponding countermeasures. Based on such a model, the embodiments provide an apparatus that automatically generates security checks in order to detect whether a security requirement-countermeasure link is broken or would be broken if a change is carried out. For example, the apparatus may be configured to annotate one or more elements of an architectural source model (e.g., a structural model and a deployment model of the application) with security requirement information and countermeasure information. In particular, one or more elements in the architectural source model may be annotated with security requirement information and countermeasure information. Generally, for each security requirement, there is one corresponding countermeasure. However, according to some aspects, there may be more than one countermeasure for a particular security requirement.

The security requirement information may identify the element and provide a description of the security requirement information (e.g., the element must use protocol X, version Y), and the countermeasure information may identify the element and provide a type of countermeasure (e.g., deployment of component to node). As such, the apparatus may capture the links between the security requirements and the countermeasures. In one aspect, the apparatus may support an interactive user interface that allows the user to provide such information, where the links between the security requirements and the countermeasures are captured using the model.

Thereafter, the apparatus may generate an executable security check for each countermeasure based on the corresponding countermeasure type. Generally, a security check may include a script that provides instructions on how to check the system's attributes to ensure that a countermeasure is properly enabled. In one example, the security check may include instructions to verify that a file or a set of files are present in a given path. According to the embodiments, the apparatus may automatically generate a security check for each countermeasure. Then, at a scheduled time or in response to an event, the apparatus may execute the security checks and record the results of such security checks. Also, a user dashboard may display the list of available checks, their status, and the results of executed checks. Further, the user dashboard permits the user to edit the security checks (including the countermeasure type and security requirement description), thereby re-generating the security check. These and other features are further explained below with reference to the figures.

Figure 1:
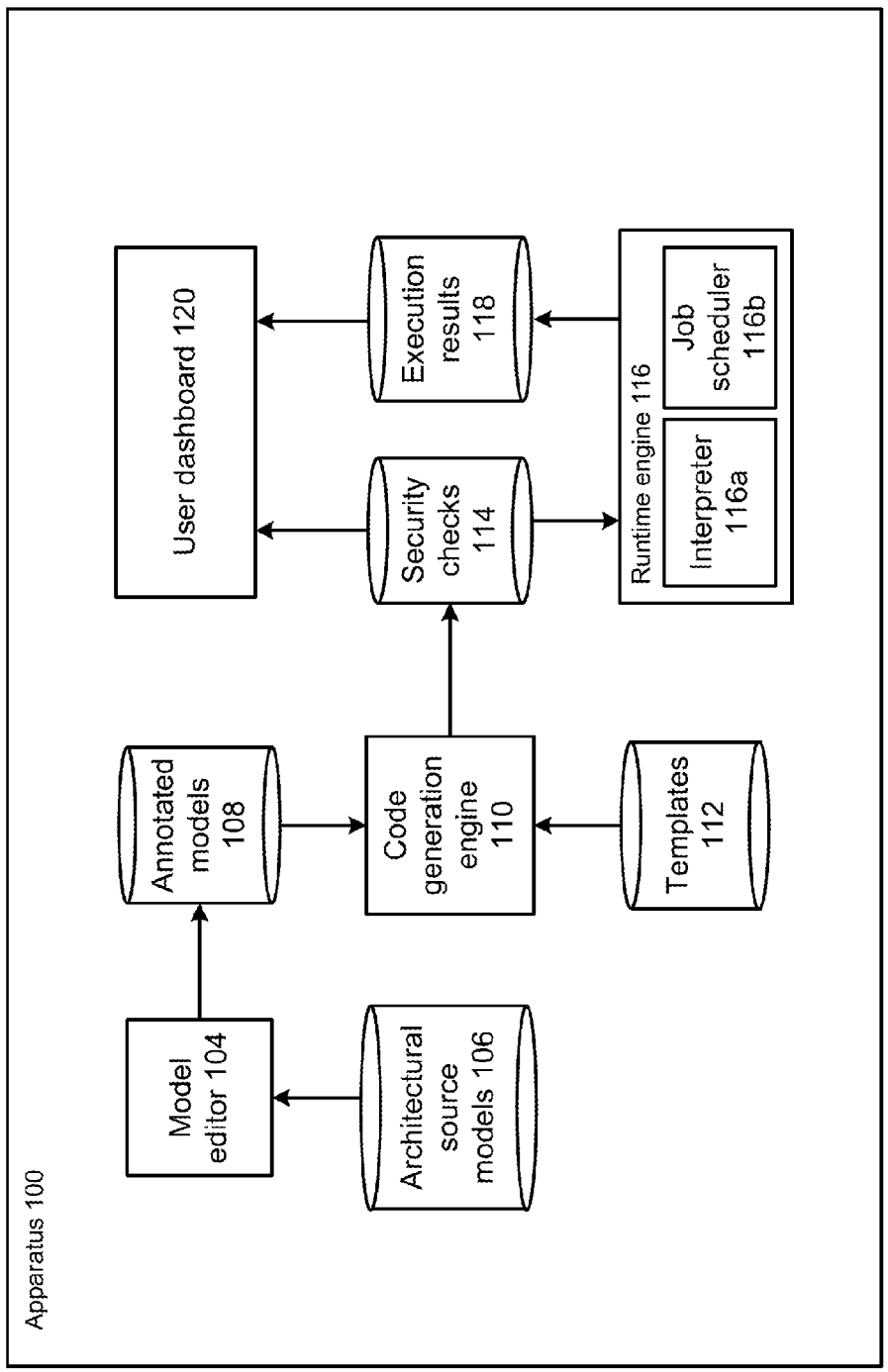
FIG. 1 illustrates an apparatus for generating security checks according to an embodiment.

FIG. 1 illustrates an apparatus 100 for generating security checks according to an embodiment. The apparatus 100 may include a model editor 104, an architectural source model database 106, an annotated model database 108, a code generation engine 110, a template database 112, a security check database 116, a runtime engine 116, an execution result database 118 and a user dashboard 120. The apparatus 100 may include other components that are well known to one of ordinary skill in the art.

The model editor 104 may be configured to annotate one or more elements of an architectural source model with security requirement information and countermeasure information. For example, the architectural source model database 106 may store architectural source models for a number of different application solutions, which have been designed by an application developer. Each architectural source model may include a plurality of elements. The plurality of elements may include one or more components, one or more communication channels between the components, and/or the deployment of the components. The components may include any type of component related to the function/deployment of an application. Stated another way, each architectural source model may include a structural model having a plurality of elements, and a deployment model that maps one or more of the elements onto an underlying deployment platform for a particular application solution.

Figure 3:
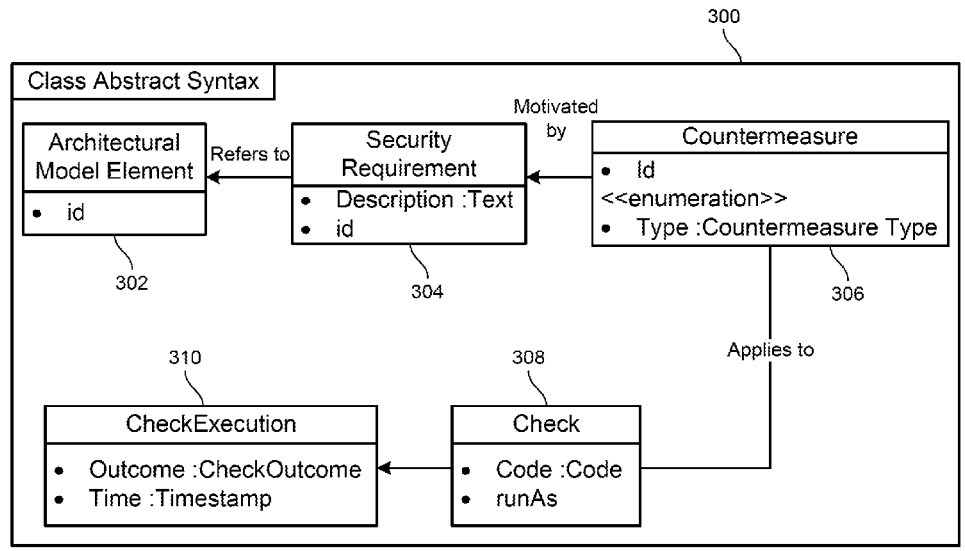
FIG. 3 illustrates a class abstract syntax of the modeling language that links the security requirements with the countermeasures for generating security checks according to an embodiment.

The modeling editor 104 may employ a modeling language that is dedicated to capturing the key pieces of information used in the apparatus 100 such as the security requirement information and the countermeasure information. The abstract syntax of the modeling language is illustrated in FIG. 3, which is explained later in the disclosure. In one embodiment, the model editor 104 may create instances of the security requirement class, which indicate the corresponding architectural element and provide a textual description of the security requirement. Also, the model editor 104 may link a countermeasure to the security requirement, which identifies the corresponding architectural element and indicates a countermeasure type.

For example, the model editor 104 may select the appropriate architectural source model from the architectural source model database 106 and annotate one or more elements of the model based on information received via a user interface. For instance, the user interface may be configured to display the architectural source model, and the user may select the appropriate elements on the architectural source model, and provide the textual description of the security requirements and the linking countermeasures.

The textual description may relate to one or more classes of architectural security requirements such as technical constraints related to functional needs (e.g., the user must be authenticated and receive authorizations corresponding to his/her role), versions of components and protocols, usage of certain security mechanisms such as access control to restrict access to qualified roles, or cryptography based mechanisms (e.g., encryption, signing), deployment of components onto physical nodes with specific security assurance characteristics, and/or physical (even geographical) positions of execution environments, which may be relevant from a physical security viewpoint and a legal/regulatory viewpoint.

Figure 2:
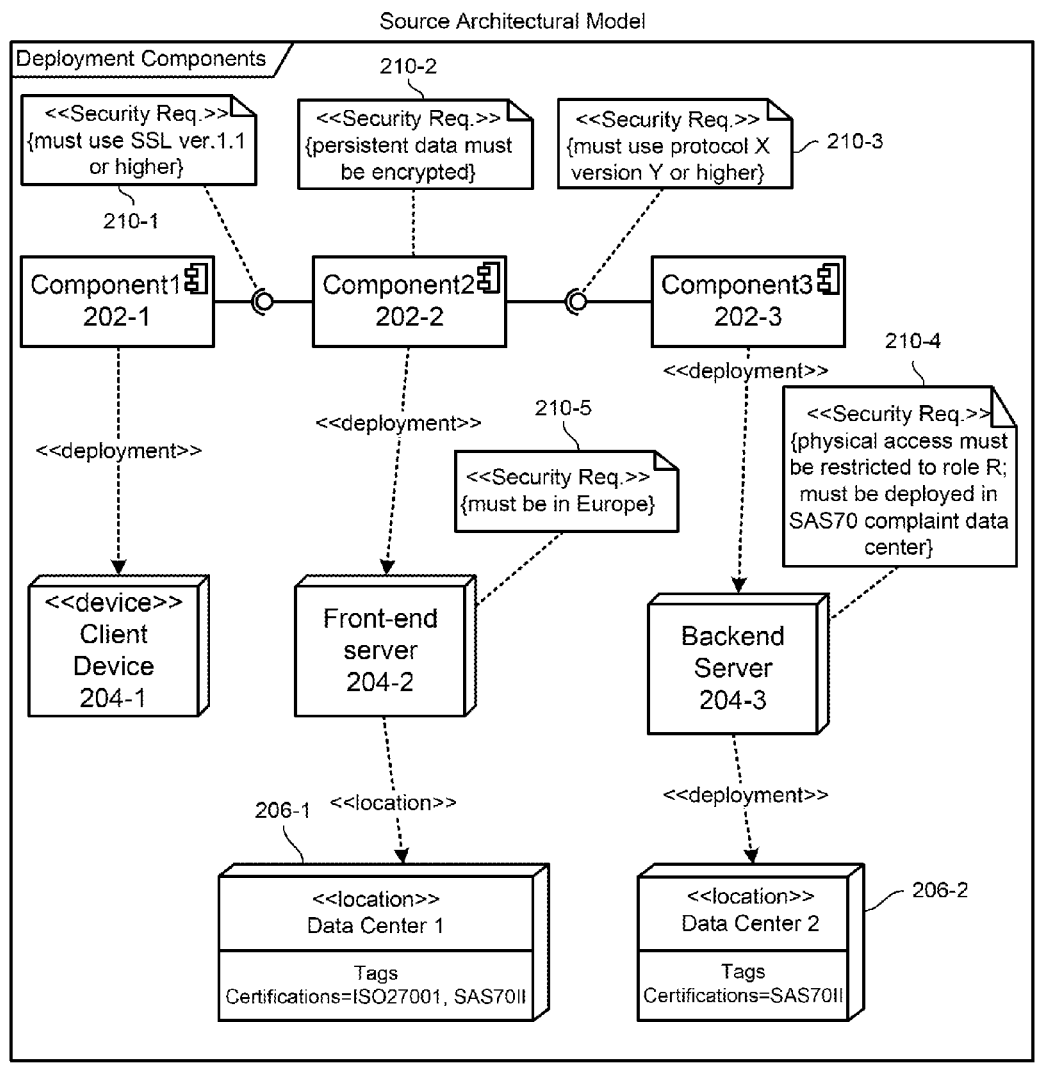
FIG. 2 illustrates an architectural source model annotated with security requirement information according to an embodiment.

FIG. 2 illustrates an architectural source model annotated with security requirement information according to an embodiment. The architectural source model may include a plurality of elements such as components 202, deployment components 204, location components 206, and the connections between each component 202 which may represent the communication channels between components. As shown in FIG. 2, one or more of these elements may be annotated with security requirement information. In the example of FIG. 2, the architectural source model includes three components 202—a first component 202-1, a second component 202-2 and a third component 202-3. The first component 202-1, the second component 202-2 and the third component 202-3 may represent any type of component related to an application.

As shown on FIG. 2, the first component 202-1 may be deployed on a client device 204-1, the second component 202-2 may be deployed on a front-end server 202-4, and the third component 202-3 may be deployed on a backend server 204-3. The connection between the first component 202-1 and the second component 202-2 may represent a first communication channel, and the connection between the second component 202-2 and the third component 202-3 may represent a second communication channel. Further, the architectural source model may include the location of the deployment components such as the location components 206, which include a first location component 206-1 and a second location component 206-2. The first location component 206-1 may represent a deployment location (e.g. Data Center 1) for the front-end server 204-2 having one or more attributes such as the appropriate certifications (e.g., ISO27001, SAS7011), and the second location component 206-2 may represent a deployment location (e.g., Data Center 2) for the backend server 204-3 having one or more attributes as the appropriate certifications (e.g., SAS70II). It is noted that the architectural source model of FIG. 2 is merely an example, where the embodiments encompass any type of arrangement of components and their deployments.

As shown in FIG. 2, the architectural source model has been annotated with security requirement information 210. In one aspect, the security requirement information 210 may include a description of the corresponding security requirement. For example, the communication channel between the first component 202-1 and the second component 202-2 has been annotated with security requirement information 210-1. The security requirement information 210-1 includes a requirement that this communication channel must use a communication channel having Secure Sockets Layer (SSL) version 1.1 or higher. Also, the second component 202-2 has been annotated with security requirement information 210-2. The security requirement information 210-2 includes a requirement that persistent data must be encrypted. The communication channel between the second component 202-2 and the third component 202-3 has been annotated with security requirement information 210-3. The security requirement information 210-3 includes a requirement that this communication channel must use a certain protocol having at least a certain version (e.g., protocol X, version Y or higher). The backend server 204-3 has been annotated with security requirement information 210-4. The security requirement information 210-4 includes a requirement that the physical access to this component must be restricted to a user having the role R and a requirement that this component be deployed in a certain data center (e.g., SAS70 complaint data center). The front-end server 204-4 has been annotated with security requirement information 210-5. The security requirement information 210-5 includes a requirement that this component be located in Europe.

Referring back to FIG. 1, besides the security requirement information, the model editor 104 may annotate one or more elements of the architectural source model with countermeasure information. The countermeasure information may also identify the element and indicate a countermeasure type to the corresponding security requirement. The countermeasure type may include a code import, configuration flag in text file, deployment of the element to a node, configuration flag in registry, dependency to a database, and configuration flag in the database. Also, the countermeasure type may include a general catch-all category such as "other" for capturing types that do not fit into the above recited countermeasure types. Further, the countermeasure type may encompass any type of countermeasure known to one of ordinary skill in the art.

Generally, the countermeasure type explains how the security requirement corresponds to a realization in the actual system (e.g., flag set in a configuration file, a particular value in a certain registry key, a specific import statement in a Java program, a dependency in a ".pom" file, etc.). Therefore, according to one embodiment, a user interface may allow the user to select the countermeasure type from a list, and then based on the type, a further choice may be presented to the user. For example, if the type of countermeasure is "configuration flag in textfile", the model editor 104 may parse the file and then provide an option to the user to select a flag among those found therein, and to provide the values that are to be considered as valid for that flag. If the type is "deployment of component to node", the model editor 104 may provide the user with an option to select the relevant component (e.g., the list of components is obtained automatically by parsing the source architecture mode) and to indicate which nodes are acceptable deployments for the respective component.

The model editor 104 may then store the architectural source model annotated with the security requirement information and the countermeasure information in the annotated models database 108. The annotated architectural source models may be stored as a machine-readable model expressed in an Extensible Markup Language (XML) dialect.

Further, it is noted that the model editor 104 may be configured to construct the architectural source model itself. However, the apparatus 100 may include a separate component for the construction of the architectural source model. For example, a user may operate the model editor 104 to build the architectural source model via a user interface. As such, the model editor 104 may include any type of program that supports construction of the architectural source model including the structural architectural model and the deployment model that maps the architecture elements into the underlying deployment platform. In one aspect, the model editor 104 may utilize a Unified Modeling Language (UML) for the construction of object-oriented artifacts representing the components of the software system. However, the model editor 104 may encompass any type of modeling language known in the art for the construction of the architectural source model. Then, the model editor 104 may store the constructed architectural source model in the architectural source model database 106.

The code generation engine 110 may receive the architectural source model annotated with security requirement information and countermeasure information and may be configured to generate security checks. For example, the code generation engine 110 may be configured to automatically generate a security check for each countermeasure based on the corresponding countermeasure type. In order to generate such a security check, the code generation engine 110 may select a security check template from the templates database 112 based on the countermeasure type. A security check template may be an outline of a security check that is general to a particular countermeasure type. In one embodiment, the templates database 112 may store a plurality of security check templates, where each template relates to a different countermeasure type. As such, for a particular countermeasure, the code generation engine 110 may select the appropriate security check template from the templates database 112 corresponding to the countermeasure type. Then, the code generation engine 110 may generate the security check based on the selected security check template. A security check may be a script that provides instructions on how to check the system's attributes to ensure that a countermeasure is properly enabled, as further explained below.

According to one aspect, the code generation engine 110 may populate other parameters of the security check from the information submitted via the user dashboard with respect to the countermeasure type. In particular, as explained above, if the user selected the type of countermeasure as "configuration flag in textfile", the model editor 104 may parse the file and then provide an option to the user to select a flag among those found therein, and to provide the values that are to be considered as valid for that flag. In this case, the code generation engine 110 may populate the security check with the provided values as well as any other information submitted via the user dashboard 120 with respect to annotating the architectural source model with countermeasure information. According to another aspect, after selection of the appropriate security check template, the code generation engine 110 may prompt the user for additional information via the user dashboard 120. In this case, the user may provide additional information related to the security check, and after the code generation engine 110 receives this information, the code generation engine 110 may finalize the security check. Still further, the code generation engine 110 may generate the complete security check based on the model itself.

The code generation engine 110 may utilize different scripting languages for the script of the security checks. For example, the code generation engine 110 may write a security check in a scripting language that best suits the specific task. For example, the code generation engine 110 may determine a scripting language based on the type of countermeasure, and then select and generate the security check with the determined scripting language. According to another embodiment, the code generation engine 110 may allow the user, via the user dashboard 120, to select a particular scripting language when providing further information related to the generation of the security check.

In addition, the code generation engine 110 may insert comments into the script of the security check such as the text describing the security requirement that motivates the countermeasure and a reference to the corresponding architectural element. As indicated above, a security check may be a script that provides instructions on how to check the system's attributes to ensure that a countermeasure is properly enabled. Some examples of security checks include 1) instructions that verify a file or a set of files are present in a given path, 2) instructions that verify that a specific package is included in a java source code, 3) instructions that verify that the version of a library in use corresponds to a specific version, and 4) instructions that verify that the physical execution environment has certain characteristics. However, the embodiments encompass any type of security check that provides instructions on how to check the system's attributes to ensure that a countermeasure is properly enabled. The code generation engine 110 may store the generated security checks in the security check database 114.

The runtime engine 116 may be configured to execute the security checks in the security check database 114 in reaction to an event or at a scheduled time. For example, the runtime engine 116 may include an interpreter 116a that interprets the script language of the security checks, and a job scheduler 116b that schedules the security checks in reaction to an event or at a scheduled time. The interpreter 116a may be any type of interpreter known to one of ordinary skill in the art such as a Phython or Php interpreter. Because the script of the security checks may be written in a number of different scripting languages, the interpreter 116a may be configured to understand and interpret a plurality of different scripting language. The job scheduler 116b may be configured to execute a particular security check at a scheduled time. For example, the job scheduler 116b may schedule a security check to be executed at a particular time of day, and/or day of the week or month, which may be executed multiple times during a period of time. In other embodiments, if the results of the security check indicate that the security check has failed, the job scheduler 116b may be configured to stop future executions of that security check until the issue is resolved. In other embodiments, the job scheduler 116b may be configured to continue executing the security check, as specified by the scheduled time, regardless of the outcome of the security check.

The runtime engine 116 may be configured to generate execution results indicating whether the security checks have passed or failed, and store the execution results in an execution results database 118. The execution results may provide the history of the security check (e.g., the date and time of each execution of the security check and whether it passed or failed).

The user dashboard 120 may be configured to display a list of the available security checks, as well as display of status of each security check. The status may include whether the security check is enabled or disabled. In this respect, by operating the user dashboard 120, the user may switch the status of a security check. For example, if the user does not wish to execute a particular security check, the user may operate the user dashboard 120 to disable the security check. Also, the user dashboard 120 may show the outcome of the last security check execution, and the time when it was performed. The outcome may be passed or failed depending on whether or not the security check was successful. A security check may be considered successful if the runtime engine 116 does not detect a mismatch of the implementation with the requirements. Also, the runtime engine 116 may determine a "broken" status if the script itself failed to run (e.g., for issues related to user privileges, necessary files not found, etc.). In such a case, the user dashboard 120 may display a broken status indicator associated with the security check execution. In addition, for each security check, the user dashboard 120 may display a history of the security check executions. For example, from the history of the check executions, the user may understand at what point in time the security check started to fail. Also, from the user dashboard 120, the user can select a check for editing, effectively re-launching the code generation engine 110. The user dashboard is further illustrated in FIG. 6, which is described later in the disclosure.

FIG. 3 illustrates a class abstract syntax 300 of the modeling language that links the security requirements with the countermeasures for generating security checks according to an embodiment. In order to annotate the security requirement information and the countermeasure information, the apparatus 100 may utilize a model language that has been developed to capture these pieces of information. According to the embodiment, the class abstract syntax 300 of the language may be defined as a metamodel, and may be realized as a UML extension using state of practice techniques. Also, it is noted that the class abstract syntax 300 may be realized as an XML schema, an Ecore (or other MOF-like) model, or a BNF grammar, which may yield equivalent functionality. However, if the architectural source model is developed using an UML extension, realizing the class abstract syntax 300 as the UML extension may be convenient since it allows using the same tool to produce both the architectural source model and the annotations (e.g., security requirements and countermeasures). In this case, FIG. 3 provides the semantics, which a UML profile can be derived directly. Such a profile may contain a stereotype for each concept (metaclass) of the metamodel, which maps the attributes of the metaclasses to corresponding tag values.

The class abstract 300 includes an architectural model element 302, security requirement information 304, countermeasure information 306, check element 308, and check execution element 310. The security requirement information 304 includes a description of the security requirement and an identifier that identifies the corresponding component, and the architectural model element 302 includes the identifier that identifiers the corresponding component. The countermeasure information 306 may be motivated by the security requirement information 304. Typically, there is a one-to-one correspondence between a security requirement and a countermeasure. However, according to some aspects, there may be more than one countermeasure for a particular security requirement. The countermeasure information 306 may include the identifier that identifies the architectural model element 302, and the countermeasure type that specifies a type of the countermeasure information. As shown in FIG. 3, the security check 308 applies to the countermeasure information 306. As explained above, the code generation engine 110 may generate the security check 308 based on the countermeasure type. The security check 308 may include the code for specifying the instructions for carrying out the relevant security check, and the check execution 310 indicates the outcome (e.g., passed/failed) and the time associated with the check execution.

Figure 4:
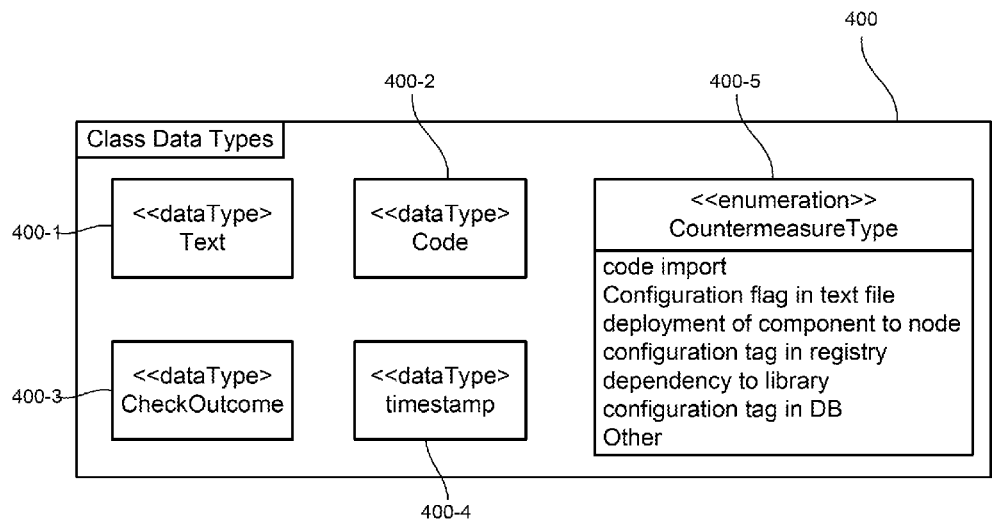
FIG. 4 illustrates data types of the class abstract of FIG. 3 according to an embodiment.

FIG. 4 illustrates data types 400 of the class abstract 300 of FIG. 3 according to an embodiment. For example, the data types 400 provide the types of data used in the class abstract 300 such as the text data type 400-1, code data type 400-2, check outcome data type 400-3, timestamp data type 400-4 and the countermeasure type 400-5. The countermeasure type 400-5 includes the list of countermeasure types presented to the user for selection. As shown in FIG. 4, the countermeasure type 400-5 includes code import, configuration flag in text file, deployment of component to node, configuration flag in registry, dependency to library, configuration tag in database (DB), and other. However, the countermeasure type 400-5 may be modified to include any type of countermeasure type.

FIG. 5 is a flowchart illustrating example operations of the apparatus 100 of FIG. 1 according to an embodiment. Although FIG. 5 is illustrated as a sequential, ordered listing of operations, it will be appreciated that some or all of the operations may occur in a different order, or in parallel, or iteratively, or may overlap in time.

At least one element in an architectural source model may be annotated with security requirement information and countermeasure information, where the security requirement information may identify the element and provide a textual description of a corresponding security requirement, and the countermeasure information may identify the corresponding element and indicate a countermeasure type to the corresponding security requirement (502). For example, the model editor 104 may be configured to annotate one or more elements of an architectural source model with security requirement information and countermeasure information. The architectural source model may include a plurality of elements comprising one or more components, one or more communication channels between the components, and/or the deployment of the components. The components may include any type of component related to the function/deployment of an application. Stated another way, the architectural source model may include a structural model having a plurality of elements, and a deployment model that maps one or more of the elements onto an underlying deployment platform for a particular application solution.

The model editor 104 may create instances of the security requirement class, which indicate the corresponding architectural element and provide a textual description of the security requirement. Also, the model editor 104 may link a countermeasure to the security requirement, which identifies the corresponding architectural element and indicates a countermeasure type. In one example, the model editor 104 may select the appropriate architectural source model from the architectural source model database 106 and annotate one or more elements of the model based on information received via a user interface. The user interface may be configured to display the architectural source model, and the user may select the appropriate elements on the architectural source model, and provide a textual description of the security requirement.

The countermeasure information may identify the element and indicate a countermeasure type to the corresponding security requirement. The countermeasure type may include a code import, configuration flag in text file, deployment of the element to a node, configuration flag in registry, dependency to a database, or configuration flag in the database. Also, the countermeasure type may include a general catch-all category such as "other" for capturing types that do not fit into the above recited countermeasure types. Generally, the countermeasure type explains how the security requirement corresponds to a realization in the actual system (e.g., flag set in a configuration file, a particular value in a certain registry key, a specific import statement in a Java program, a dependency in a ".pom" file, etc.). Therefore, according to one embodiment, the user interface allows the user to select the countermeasure type from a list, and the user may enter further information related to the countermeasure.

As a result, the model editor 104 may be configured to output a model including the instances of the security requirement (attached to the corresponding architectural element) and the countermeasures (which explains how the requirement corresponds to a realization in the actual system). As shown in FIG. 3, the security requirement information 304 includes a description of the security requirement and an identifier that identifies the corresponding component. The countermeasure information 306 may include the identifier that identifies the architectural model element 302, and the countermeasure type that specifies a type of the countermeasure information.

A security check may be automatically generated for the countermeasure information based on the countermeasure type (504). For example, the code generation engine 110 may receive the architectural source model annotated with security requirement information and countermeasure information and may be configured to generate security checks. For example, the code generation engine 110 may be configured to automatically generate a security check for each countermeasure based on the corresponding countermeasure type. Generally, a security check may be a script that provides instructions on how to check the system's attributes to ensure that a countermeasure is properly enabled.

In order to generate such a security check, the code generation engine 110 may select a security check template from the templates database 112 based on the countermeasure type. A security check template may be an outline of a security check that is general to a particular countermeasure type. According to one embodiment, the templates database 112 may store a plurality of security check templates, where each template relates to a different countermeasure type. For a particular countermeasure, the code generation engine 110 may select the appropriate security check template from the templates database 112 corresponding to the countermeasure type. Then, the code generation engine 110 may generate the security check based on the selected security check template. According to one aspect, the code generation engine 110 may populate other parameters of the security check from the information submitted via the user interface with respect to the countermeasure type. In particular, as explained above, if the user selected the type of countermeasure as "configuration flag in textfile", the model editor 104 may parse the file and then provide an option to the user to select a flag among those found therein, and to provide the values that are to be considered as valid for that flag. In this case, the code generation engine 110 may populate the security check with the provided values as well as any other information submitted via the user interface with respect to annotating the architectural source model with countermeasure information. According to another aspect, after selection of the appropriate security check template, the code generation engine 110 may prompt the user for additional information via the user interface. In this case, the user may provide additional information related to the security check, and after the code generation engine 110 receives this information, may finalize the security check. Still further, the code generation engine 110 may generate the complete security check based on the model itself.

The security checks may include instructions that verify a file or a set of files are present in a given path, verify that a specific package is included in a java source code, verify that the version of a library in use corresponds to a specific version, and/or verify that the physical execution environment has certain characteristics. However, the embodiments encompass any type of security check that provides instructions on how to check the system's attributes to ensure that a countermeasure is properly enabled. The code generation engine 110 may store the generated security checks in the security check database 114. In addition, the code generation engine 110 may insert comments into the script of the security check such as the text describing the security requirement that motivates the countermeasure and a reference to the corresponding architectural element.

As indicated above, the runtime engine 116 may be configured to generate execution results indicating whether the security checks have passed or failed, and store the execution results in an execution results database 118. The execution results may provide the history of the security check (e.g., the date and time of each execution of the security check and whether it passed or failed). The user dashboard 120 may be configured to display a list of the available security checks, as well as display of status of each security check.

Figure 6:
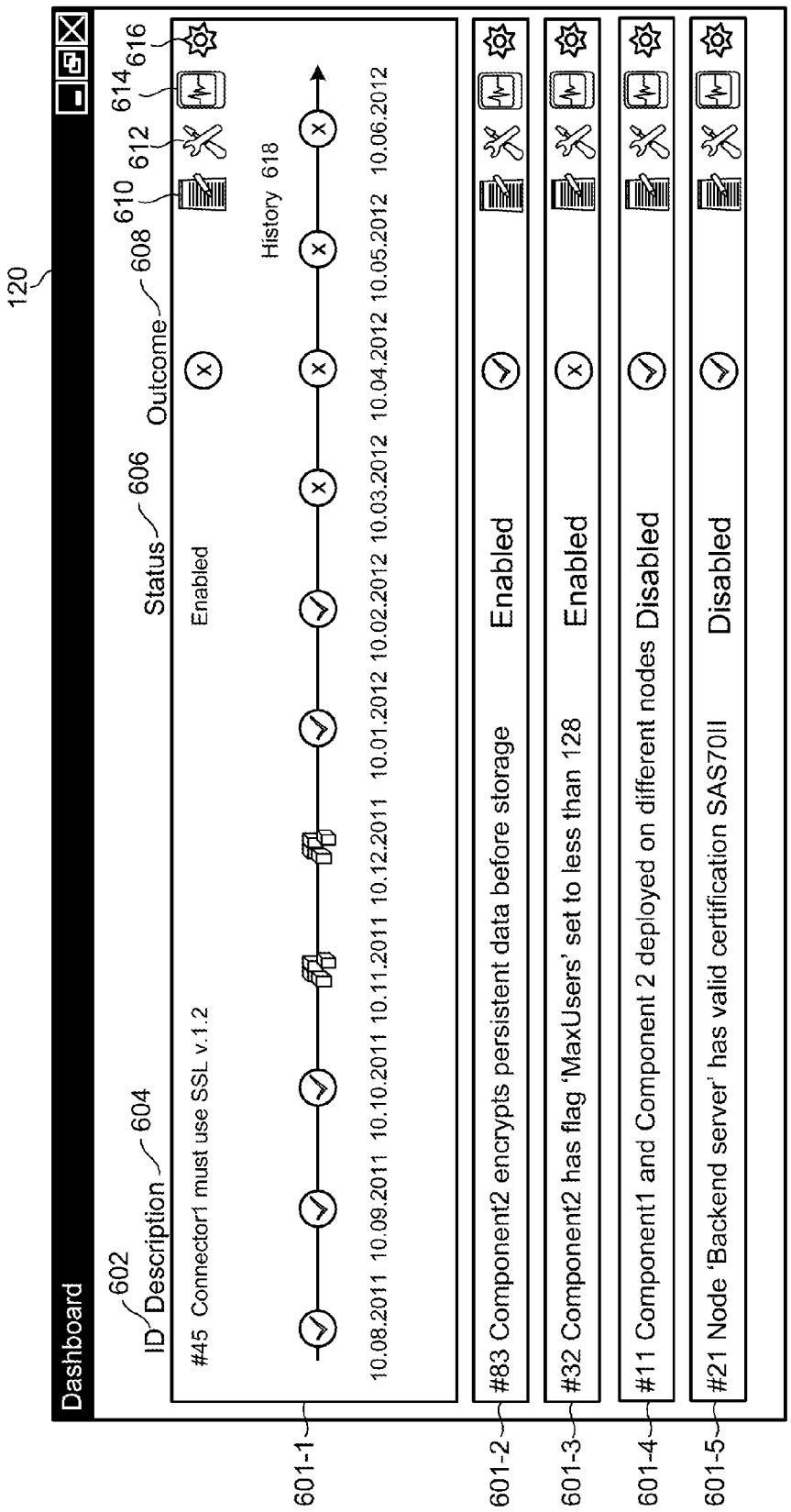
FIG. 6 illustrates an example user dashboard according to an embodiment.

FIG. 6 illustrates an example user dashboard 120 according to an embodiment. For example, the user dashboard 120 may display a list of available security checks 601 such as a first security check 601-1, a second security check 601-2, a third security check 601-3, a fourth security check 601-4, and a fifth security check 601-5. However, more generally, each line in the user dashboard 120 corresponds to a triple (e.g., the security requirement, the countermeasure, and the check). The embodiments encompass any number of security checks 601 or lines to be included on the user dashboard 120. For each security check 601, the user dashboard 120 provides an identifier 602 of the security requirement, a description 604 of the security requirement, a status 606 indicating whether the security check is enabled or disabled, an outcome 608 of the most recent execution, and a plurality of tools 610-616 including an editing tool 610 for visualizing and editing the security check, an execution configuration tool 612 for configuring execution preferences such as scheduling, a history tool 614 for providing a history 618 of the security check (as shown with reference to the first security check 601-1), and an execution trigger tool 616 for immediately triggering the security check.

The history 618 of a security check is made visible by selecting the history tool 614. The timeline of the history 618 displays the past check executions and their outcome. As shown in the history 618, the security check is scheduled to run on a monthly basis. The first few executions had a 'PASSED' outcome. Then, starting from the execution of 11 Nov. 2011, the security check could not run property (e.g., it was 'BROKEN'), possibly because of an error in the check that was introduced by manually tweaking it, or because of transient conditions in the execution environment. This issue was solved after 10 Dec. 2011 and the subsequent two executions had a positive outcome again (PASSED). Then, starting from the execution of March 2012, the check failed, because Connector 1 stopped using the right version of SSL, or because SSL was disabled altogether. With respect to the editing tool 610, the user may select this option, thereby prompting the apparatus 100 to re-launch the code generation engine 110. For example, the apparatus 100 may provide a user interface in order to allow the user to adjust the security requirement information and the countermeasure information.

Figure 7:
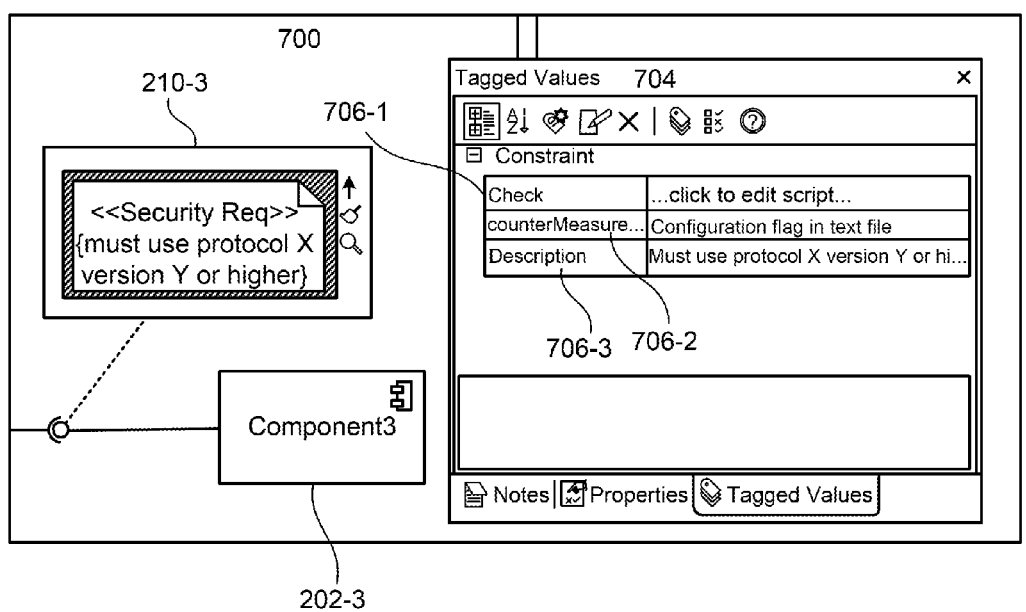
FIG. 7 illustrates a screenshot providing a user interface for annotating an element of the architectural source model with security requirement information and countermeasure information according to an embodiment.

FIG. 7 illustrates a screenshot providing a user interface 700 for annotating an element of the architectural source model with security requirement information and countermeasure information according to an embodiment. For example, the user interface 700 permits the user to edit the properties (e.g., tagged values 704 in UML parlance) associated with a component of the architectural source model. In the example of FIG. 7, referring to FIG. 2, the communication channel between the second component 202-2 and the third component 202-3 has been annotated with security requirement information 210-3 (e.g., must use protocol X, version Y or higher). The portion of the user interface 700 associated with the tagged values 704 allows the user to edit the security check 706-1, the countermeasure type 706-2 and the description 706-3 of the security requirement information. For example, upon selection of a field associated with the security check 706-1, a user may be able to edit the script of the security check. Also, the user can change the countermeasure type 706-2, as well as adjust the description 706-3 of the security requirement description.

As explained above, the embodiments provide a model to capture the dependencies between security requirements and the corresponding countermeasures. Based on such a model, the embodiments provide an apparatus 100 that automatically generates security checks in order to detect whether a security requirement-countermeasure link is broken or would be broken if a change is carried out. Also, the apparatus 100 may explicitly document the rationale underlying the development, deployment and operation choices. For instance, the user can easily identify the reason why a component was deployed in a specific execution environment, why a communication channel uses a particular protocol, and why a particular configuration flag of a component is set to a specific value, for example. Also, the apparatus 100 may automatically detect a constraint violation. For example, by leveraging the explicit documentation of the rationale of implementation and configuration choices, breaking a link between an architectural requirement and its corresponding realization will not go unnoticed. Further, the embodiments may provide a reduced cost of operation for long-lived deployments by documenting and managing the link that traces countermeasures to their architectural motivation. This is especially helpful in systems that run continuously for a long time, for which the rationale of decision may be lost over the course of years if not properly captured and managed.

Various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus for generating security checks, the apparatus comprising:
   at least one processor;
   a non-transitory computer-readable storage medium including instructions executable by the at least one processor, the instructions configured to implement,
   a model editor configured to obtain a source model for implementing an application solution within a system, the source model including an arrangement of a plurality of elements for implementing the application solution within the system;

the model editor configured to annotate the source model including annotating at least one element of the plurality of elements with a security requirement associated with the at least one element, and annotating the at least one element with a countermeasure, the countermeasure information, the countermeasure being a configuration option for realizing the security requirement within the system, the countermeasure including a countermeasure type and at least one parameter corresponding to the countermeasure type, the model editor configured to store the annotated source model, the annotated source model providing links among the at least one element, the security requirement, and the countermeasure; and a code generation engine configured to obtain the annotated source model, and generate a security check for the countermeasure including selecting a security check template from a plurality of security check templates that corresponds to the countermeasure type and populating the selected security check with the at least one parameter, the security check template being an outline of the security check that is general to the countermeasure type, the security check being a script to check attributes of the system to verify that the countermeasure is enabled.

2. The apparatus of claim 1, wherein the code generation engine is configured to insert comments into the script of the security check, the comments providing a description of the security requirement that motivated the countermeasure.

3. The apparatus of claim 1, wherein the code generation engine is configured to determine a scripting language for the script of the security check based on the countermeasure type, and generate the script using the determined scripting language.

4. The apparatus of claim 1, wherein the at least one element is a functional component of the application solution, and the security requirement includes a requirement that at least a portion of data persisted by the functional component is encrypted.

5. The apparatus of claim 1, wherein model editor is configured to receive, via a user interface, a selection of the countermeasure type from a user, the countermeasure type having been selected from a list of countermeasure types presented to the user, the model editor configured to receive, via the user interface, the at least one parameter.

6. The apparatus of claim 1, wherein the countermeasure type is a first countermeasure type, the plurality of security check templates including a first security check template corresponding to the first countermeasure type, and a second security check template corresponding to a second countermeasure type, the code generation engine configured to select one of the plurality of security check templates that corresponds to the countermeasure type provided within the annotated source model including selecting the first security check template.

7. The apparatus of claim 1, wherein the at least one element is a communication channel link between a first functional component and a second functional component of the source model, the annotated security requirement being a requirement that the communication channel link is a communication channel having a specified security protocol.

8. The apparatus of claim 1, further comprising:
a runtime engine configured to execute the security check in reaction to an event or at a scheduled time and generate execution results indicating whether or not the countermeasure has been enabled within the system.

9. The apparatus of claim 8, wherein the runtime engine is configured to provide, via a user interface, a list of available security checks including the generated security check, outcome information indicating execution results and execution times of one or more security checks, and history information indicating past execution results and execution times for one or more available security checks.

10. The apparatus of claim 9, wherein the runtime engine is configured to receive, via the user interface, information that edits the generated security check, and the code generation engine is configured to re-generate the security check based on the received information.

11. A method for generating security checks performed by one or more processors, the method comprising:
obtaining a source model for implementing an application solution within a system, the source model including an arrangement of a plurality of elements for implementing the application solution within the system;
annotating the source model including annotating at least one element of the plurality of elements with a security requirement associated with the at least one element, and annotating the at least one element with a countermeasure, the countermeasure being a configuration option for realizing the security requirement within the system, the countermeasure including a countermeasure type and at least one parameter corresponding to the countermeasure type;
storing the annotated source model, the annotated source model providing links among the at least one element, the security requirement, and the countermeasure; and
generating a security check for the countermeasure including selecting a security check template from a plurality of security check templates that corresponds to the countermeasure type and populating the selected security check with the at least one parameter, the security check template being an outline of the security check that is general to the countermeasure type, the security check being a script to check attributes of the system to verify that the countermeasure is enabled.

12. The method of claim 11, further comprising:
inserting comments into the script of the security check, the comments providing a description of the security requirement that motivated the countermeasure.

13. The method of claim 11, further comprising:
determining a scripting language for the script of the security check based on the countermeasure type; and
generating the script using the determined scripting language.

14. The method of claim 11, wherein the at least one element is a server, and the security requirement is a requirement that the server is located within a specified geographical area.

15. The method of claim 11, wherein the countermeasure type is a first countermeasure type, the plurality of security check templates including a first security check template corresponding to the first countermeasure type, and a second security check template corresponding to a second countermeasure type, the code generation engine configured to select one of the plurality of security check templates that corresponds to the countermeasure type provided within the annotated source model including selecting the first security check template.

16. The method of claim 11, further comprising:
executing the security check in response to an event or at a scheduled time including obtaining the security check from a database, interpreting the script of the security check, and determining whether or not the countermeasure has been enabled within the system.

17. A non-transitory computer-readable medium storing instructions that when executed cause at least one processor to:
- obtain a source model for implementing an application solution within a system, the source model including an arrangement of a plurality of elements for implementing the application solution within the system;
- annotate the source model including annotating at least one element of the plurality of elements with a security requirement associated with the at least one element, and annotating the at least one element with a countermeasure, the countermeasure being a configuration option for realizing the security requirement within the system, the countermeasure including a countermeasure type and at least one parameter corresponding to the countermeasure type; and
- generate a security check for the countermeasure including selecting a security check template from a plurality of security check templates that corresponds to the countermeasure type and populating the selected security check with the at least one parameter, the security check template being an outline of the security check that is general to the countermeasure type, the security check being a script to check attributes of the system to verify that the countermeasure is enabled.

18. The non-transitory computer-readable medium of claim 17, further comprising instructions that when executed cause the at least one processor to:
- insert comments into the script of the security check, the comments providing a description of the security requirement that motivated the countermeasure.

19. The non-transitory computer-readable medium of claim 17, wherein the annotated source model includes a class abstract syntax of a modeling language used to design the source model, the class abstract syntax providing objects that link the countermeasure with the security requirement and link the security requirement with the at least one element.

20. The non-transitory computer-readable medium of claim 19, wherein the modeling language is a Unified Modeling Language (UML).

* * * * *